US012588575B2

(12) United States Patent
Lauwen

(10) Patent No.: US 12,588,575 B2
(45) Date of Patent: Mar. 31, 2026

(54) WEEDING UNIT AND METHOD FOR TREATING AN AGRICULTURAL FIELD

(71) Applicant: AGCO International GmbH, Neuhausen (CH)

(72) Inventor: Eerke Lauwen, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 435 days.

(21) Appl. No.: 18/328,885

(22) Filed: Jun. 5, 2023

(65) Prior Publication Data

US 2023/0413705 A1 Dec. 28, 2023

(30) Foreign Application Priority Data

Jun. 24, 2022 (GB) ...................................... 2209334

(51) Int. Cl.
*A01B 39/18* (2006.01)

(52) U.S. Cl.
CPC .................................... *A01B 39/18* (2013.01)

(58) Field of Classification Search
CPC ......... A01B 39/00; A01B 39/18; A01B 39/06; A01B 39/08; A01B 39/12; A01B 39/22; A01B 39/15; A01B 19/00; A01B 19/06; A01B 25/00; A01B 79/005; A01B 39/26
USPC ........................................ 171/26, 30, 50, 53
See application file for complete search history.

(56) References Cited

U.S. PATENT DOCUMENTS 10,701,852 B2 7/2020 Calleija et al.
2018/0153084 A1* 6/2018 Calleija ................ A01B 79/005

FOREIGN PATENT DOCUMENTS

| CN | 112655288 A | 4/2021 |
| CN | 112868285 A | 6/2021 |
| CN | 113396650 A | 9/2021 |
| CN | 215222938 U | 12/2021 |
| CN | 217591491 U | * 10/2022 |
| JP | H10313604 A | * 12/1998 |

OTHER PUBLICATIONS

CN 217591491 (Year: 2022).*
JP H10313604 (Year: 1998).*
JP-H10313604-A (Year: 1998).*
UK Intellectual Property Office, Search report for related UK Application No. GB2209334.8, dated Dec. 14, 2022, 4 pages.

* cited by examiner

*Primary Examiner* — Christopher J Sebesta
*Assistant Examiner* — Evan A Bregel

(57) ABSTRACT

A weeding unit for treating an agricultural field includes a carrier, at least one working lever movably connected with the carrier, at least one actuator for moving the at least one working lever, and a control unit. The control unit is configured to distinguish crop from weed and to control the at least one actuator for treating the weed. The at least one working lever includes a weeding knife and at least one harrowing tine. Methods for treating an agricultural field are also disclosed.

19 Claims, 9 Drawing Sheets

WEEDING UNIT AND METHOD FOR TREATING AN AGRICULTURAL FIELD

CROSS-REFERENCE TO RELATED APPLICATION

This application claims the benefit of the filing date of U. K. Patent Application GB 2209334.8, filed Jun. 24, 2022, the entire disclosure of which is incorporated herein by reference.

FIELD

The present disclosure relates generally to a weeding unit and method for weeding and harrowing an agricultural field.

BACKGROUND

U.S. patent application Ser. No. 17/929,393, "Vehicles and methods for treating an agricultural field", filed on Sep. 2, 2022, discloses a vehicle for treating an agricultural field that includes a weeding-injection unit and a control unit. The weeding-injection unit includes at least one weeding knife and at least one actuator configured to move the at least one weeding knife for cutting and destroying weed. The control unit is configured to identify a plant and to control the at least one actuator to treat the identified plant.

BRIEF SUMMARY

When weed is cut by a weeding unit, the roots or parts of the roots of the weed may remain in the soil of the agricultural field and may grow again. It would be beneficial to have a weeding unit that separates and removes the roots out of the agricultural field.

Some embodiments of a weeding unit for treating an agricultural field include a carrier, at least one working lever movably connected with the carrier, at least one actuator for moving the at least one working lever, and a control unit configured to distinguish crop from weed and to control the at least one actuator for treating the weed. The at least one working lever includes a weeding knife and at least one harrowing tine.

When crop is detected, the at least one working lever may be moved to an opened position to avoid damaging the crop by the weeding knife and the at least one harrowing tine. In case of weed, the at least one working lever may be moved to a closed position to cut the weed with the weeding knife. The at least one harrowing tine may harrow the agricultural field and pull the weed cut by the weeding knife. While the weed is pulled by the at least one harrowing tine, the roots or part of the roots of the weed are pulled out of the soil and removed from soil.

The weeding unit may also include a camera for detecting crop and weed.

Based on the captured images of the camera, the control unit may distinguish crop from weed and control the working lever to treat the weed and to spare the crop.

The at least one harrowing tine may be movably connected with the weeding knife for moving the at least one harrowing tine relative to the weeding knife.

Thus, the at least one harrowing tine may be movable in a different direction than the weeding knife or may be movable independently from the weeding knife.

The at least one harrowing tine may be connected with a locking mechanism for blocking a movement of the at least one harrowing tine relative to the weeding knife.

The locking mechanism may be a ratchet to block and unlock the at least one harrowing tine. If blocked, the at least one harrowing tine may move synchronously with a movement of the weeding knife such that the least one harrowing tine is fixed to the weeding knife. If unlocked, the at least one harrowing tine may by movable relative to the weeding knife.

The at least one harrowing tine may be pivotably connected with the weeding knife about a pivot axis.

In some embodiments, the at least one harrowing tine may be connected to the weeding knife by a pivot joint for rotating on the weeding knife.

The at least one working lever may be pivotably connected with the carrier about a pivot axis. The pivot axis of the working lever may be parallel to the pivot axis of the harrowing tine.

If both the pivot axis of the working lever and the pivot axis of the harrowing tine are parallel, the range of the relative movement of the at least one harrowing tine can be extended without the risk of a collision between the at least one harrowing tine and the working lever.

The least one working lever may include a first actuating element configured to move the at least one harrowing tine into a first deflected position.

The at least one working lever may comprises a second actuating element configured to move the at least one harrowing tine into a second deflected position.

The movement caused by the first actuating element may be contrary to the movement of the second actuating element so that the at least one harrowing tine may be movable from the first deflected position to the second deflected position and vice versa.

The first actuating element and the second actuating element may be configured to move the at least one harrowing tine contrary for urging the at least one harrowing tine into a neutral position.

The neutral position may be a position between the first and the second deflected position. Starting from the neutral position, the at least one harrowing tine may be rotated into the first deflected position when rotated in a first rotation direction and into the second deflected position when rotated in a second rotation direction contrary to the first rotation direction.

The actuating element may be a torsion spring, for example. In such embodiments, one end of the torsion spring may be fixed to the working lever and the other end to the at least one harrowing tine. If both, the first and the second actuating element are designed as a torsion spring, the spring force of the first actuating element may be oriented contrary to the spring force of the second actuating element. The actuating element for moving the at least one harrowing tine into the first or the second deflected position may be any other device such as an electromechanical actuator controlled by the control unit. In this case, the first and second actuating element are combined in the same actuating element.

The at least one working lever may comprise at least one adjuster for adjusting the actuation force of the actuating element.

For example, the adjuster may be configured to adjust the bias of the torsion spring. The higher the bias is adjusted, the higher the actuation force of the corresponding actuation actuating element may be adjusted. Dependent on the setting of the adjuster, the actuation delay of the movement of the at least one harrowing tine can be adjusted for both moving into the first deflected position and moving into the second deflected position.

The least one working lever may comprise a first adjuster for adjusting the actuation force of the first actuating element and a second adjuster for adjusting the actuation force of the second actuating element.

The actuation force for moving the at least one harrowing tine into the second deflected position may be adjusted higher than the actuation force for moving the at least one harrowing tine into the first deflected position.

Thus, it can be ensured that the at least one harrowing tine may be moved back to the neutral position when deflected in the second position.

The at least one adjuster may be an adjustment screw integrated into the weeding knife, but other adjusters instead of an adjustment screw may be possible.

The at least one harrowing tine may be designed such that a ground engageable end of the at least one harrowing tine in at least a neutral position of the harrowing tine is more distant from the carrier than a blade of the weeding knife.

Thus, the weed is cut before the at least one harrowing tine gets in contact with the weed to pull the roots out of the soil. Another advantages of a longer distance are a higher efficiency of the weeding action and that the risk for residue build-up is decreased. The at least one harrowing tine may be configured so that the ground engageable end is more distant from the carrier than a blade of the weeding knife in positions of the harrowing tine other than the neutral position.

An inclination of the at least one harrowing tine may be adjustable. Thus, an angle between the at least one harrowing tine and the ground of the agricultural field can be altered. For example, the angle between the at least one harrowing tine and the ground may be adjusted to increase the chance that residue or dragged weeds will be released earlier.

Some embodiments include a method for treating an agricultural field with a weeding unit traversing the agricultural field with actions of detecting crop in a crop row of the agricultural field, moving the at least one weeding knife to an opened position and moving the at least one harrowing tine to a neutral position for preventing of treating the crop, moving the at least one weeding knife to a closed position while the at least one harrowing tine remains in a deflected position for treating the crop row with the at least one weeding knife, and moving the at least one harrowing tine to the neutral position delayed to the at least one weeding knife for additional treating of the crop row with the at least one harrowing tine.

The method may be used to control the weeding unit described above. When crop is detected, the at least one working lever may be moved to an opened position to avoid damaging the crop by the weeding knife and the at least one harrowing tine. The at least one harrowing tine may be moved to the neutral position for preventing of treating the crop based on a friction force between the ground of the agricultural field and the ground engageable end of the at least one harrowing tine. In case of weed, the at least one working lever may be moved to a closed position to cut the weed with the weeding knife. The at least one harrowing tine may remain in the deflected position to avoid a damage of the crop. After the weed was cut by the weeding knife, the at least one harrowing tine may harrow the agricultural field and pull the weed cut by the weeding knife. While the weed is pulled by the at least one harrowing tine, the roots or part of the roots of the weed are pulled out of the soil and removed from soil.

The delayed movement of the at least one harrowing tine to the neutral position may be time-delayed.

The delayed movement of the at least one harrowing tine to the neutral position may be based on a travel distance of the weeding unit.

The delayed movement of the at least one harrowing tine may be adjustable by the adjuster. In case of an electromechanical actuator for controlling the at least one harrowing tine, the delayed movement may be controllable by the control unit.

The at least one weeding knife may be moved to a closed position if weed, an absence of crop, or both is detected.

Since no crop is detected, no crop may be damaged when the at least one weeding knife is moved to the closed position. The weeding knives can be moved to the closed position even if no weed is detected to aerate the soil by the blades of the weeding knives.

The method may also include separating roots of a weed from soil of the agricultural field with the at least one harrowing tine.

As mentioned above, the at least one harrowing tine may harrow the agricultural field and pull the weed cut by the weeding knife. While the weed is pulled by the at least one harrowing tine, the roots or part of the roots of the weed are pulled out of the soil and removed from soil.

An implement may include at least one weeding unit, wherein the implement is configured to bring each weeding unit into alignment with a separate crop row.

The camera may be used to detect a lateral deviation or misalignment between a weeding unit and a corresponding the crop row. The implement may comprise an actuator for lateral displacement of the weeding units to bring each weeding unit into alignment with its corresponding crop row.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

Figure 1:
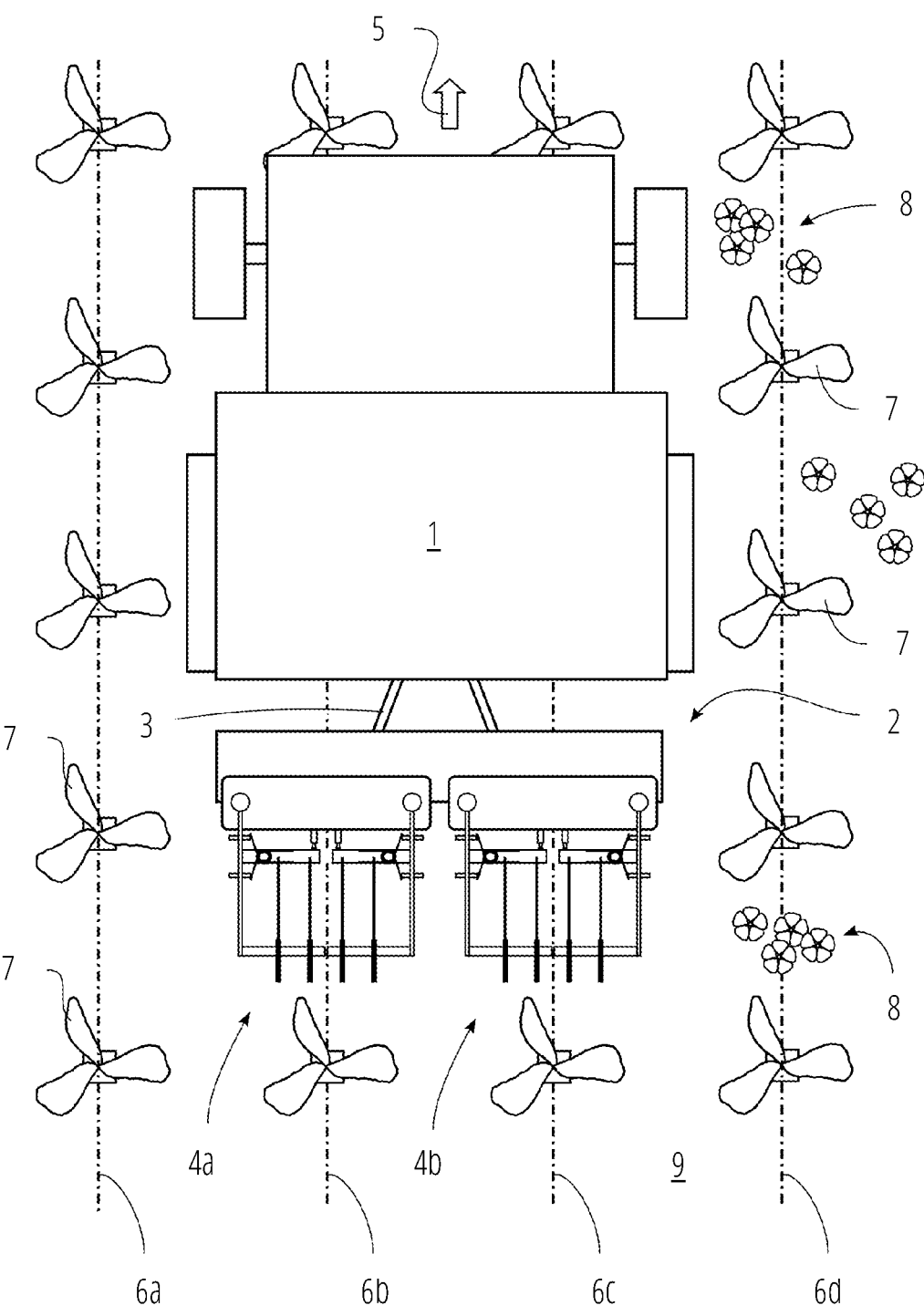
FIG. 1 illustrates a simplified top view of an agricultural vehicle with an implement having two weeding units for weeding and harrowing weed.

FIG. 1 shows an agricultural vehicle 1 driving on an agricultural field 9 in a driving direction 5. The agricultural vehicle 1 comprises a hitch 3 to which an implement 2 is connected. The implement 2 comprises two weeding units 4a and 4b for treating weeds 8 growing on the agricultural field 9 between crops 7. The weeding unit 4a may be equivalent to the weeding unit 4b.

The crops 7 are arranged in different crop rows 6a, 6b, 6c, and 6d. The position of the weeding units 4a and 4b may be adjustable so that each weeding unit 4a and 4b may be brought into alignment with a separate crop row, e.g. weeding unit 4a with crop row 6b and weeding unit 4b with crop row 6c.

Figure 2A:
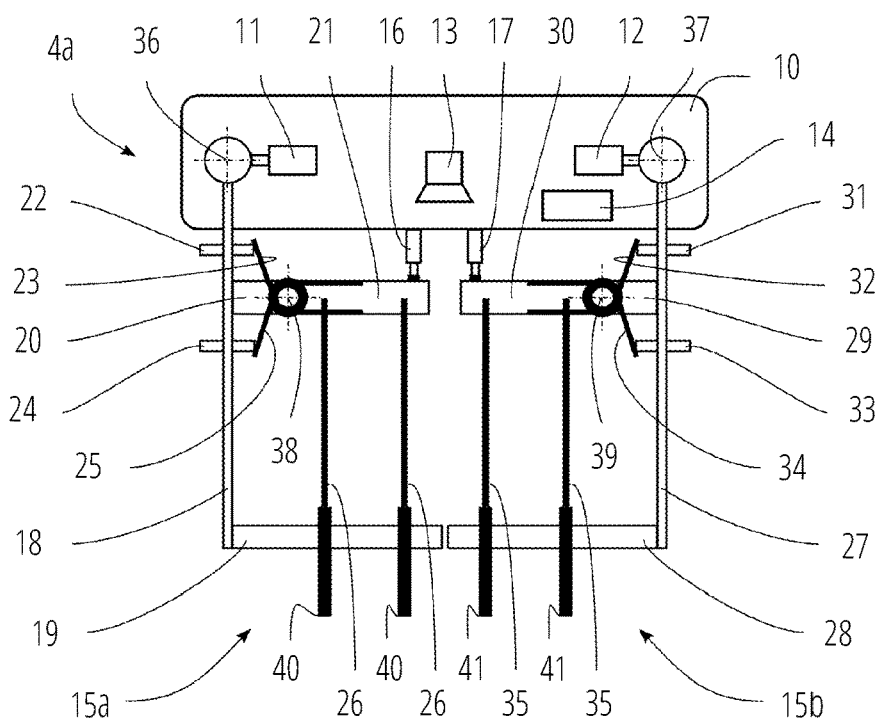
FIG. 2A illustrates a weeding unit with working levers in a closed position.
Figure 2B:
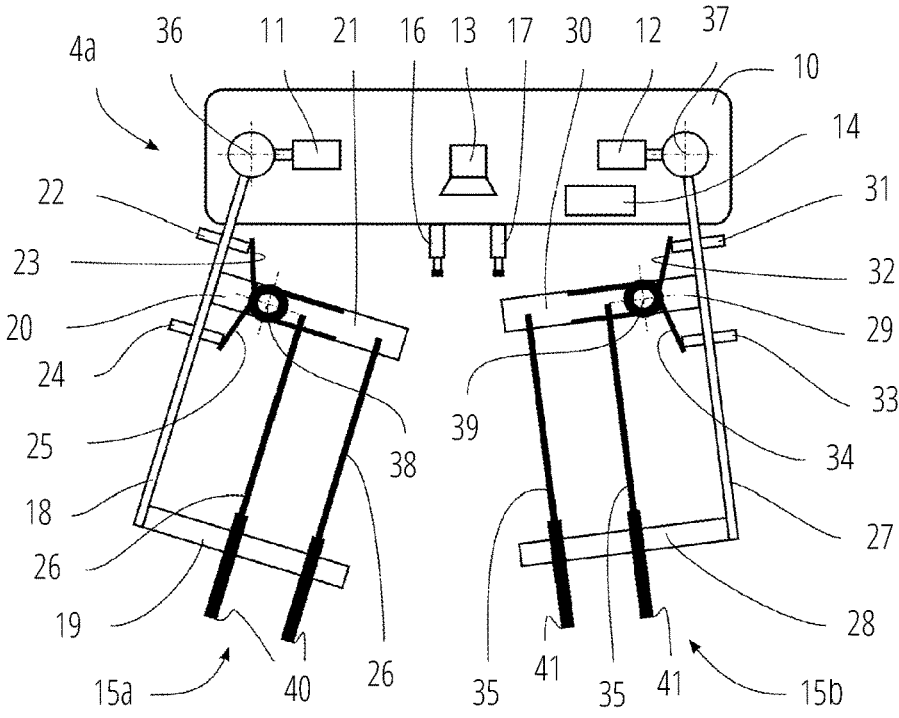
FIG. 2B illustrates the weeding unit with working levers in an opened position.

FIG. 2A and FIG. 2B show one of the weeding units in more detail, e.g., weeding unit 4a. The weeding unit 4a comprises a carrier 10 to which a left working lever 15a and a right working lever 15b are pivotably connected. The left working lever 15a may rotate about a left pivot axis 36 and the right working lever 15b may rotate about a right pivot axis 37. The left working lever 15a is driven by a left actuator 11 and the right working lever 15b is driven by a right actuator 12 to pivot the working levers 15a and 15b.

The actuators 11 and 12 may comprise an electric motor and a gear or any other type of drive, such as a hydraulic drive.

The carrier 10 also comprises a camera 13 for detecting the crops 7 and the weeds 8. The camera 13 is connected with a control unit 14 to send the captured images of the crops 7 and weeds 8 to the control unit 14. The control unit 14 analyzes the captured images and distinguishes crop 7 from weed 8. Depending on whether crop 7 or weed 8 was detected, the control unit 14 controls the left and the right actuator 11 and 12 to drive the left and right working levers 15a and 15b. The left and the right actuator 11 and 12 may drive the left and right working levers 15a and 15b independently from each other (see FIG. 2B). The left and right working levers 15a and 15b are rotated into a closed position as shown in FIG. 2A if weed 8 is detected and into an opened position (e.g., as shown in FIG. 2B) if crop 7 is detected.

The captured images of the cameras 13 of each weeding unit 4a and 4b are also used to check whether the positions of the weeding units 4a and 4b are in alignment with the corresponding crop rows, for example, whether weeding unit 4a is aligned with crop row 6b and weeding unit 4b is aligned with crop row 6c. If not, the implement 2 adjusts the position of the corresponding weeding unit to bring each weeding unit 4a and 4b into alignment with its corresponding crop row. Optionally, also the hitch 3 may be adjusted to change the position of the implement 2. Also optionally, the implement 2 may comprise a GNSS receiver to determine and adjust the position of the implement 2 or the weeding units 4a and 4b to bring them in alignment with the crop rows.

Figure 10A:
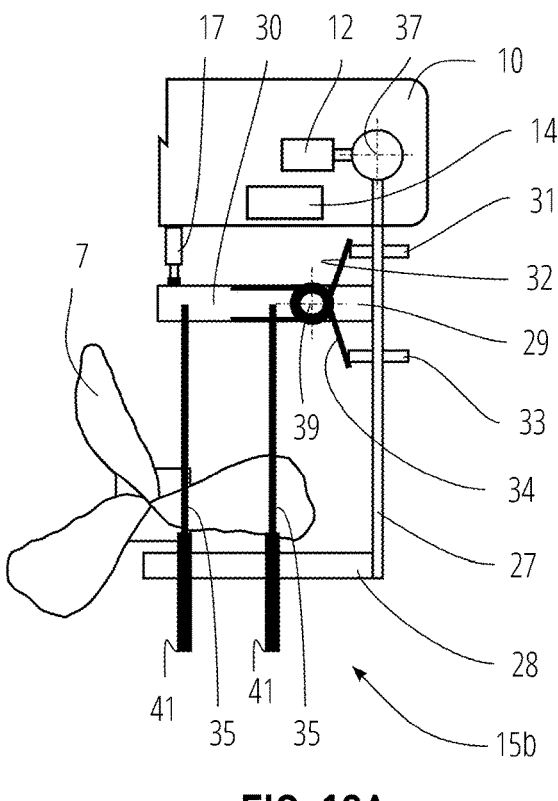
FIG. 10A illustrates the right working lever of the weeding unit.
Figure 10B:
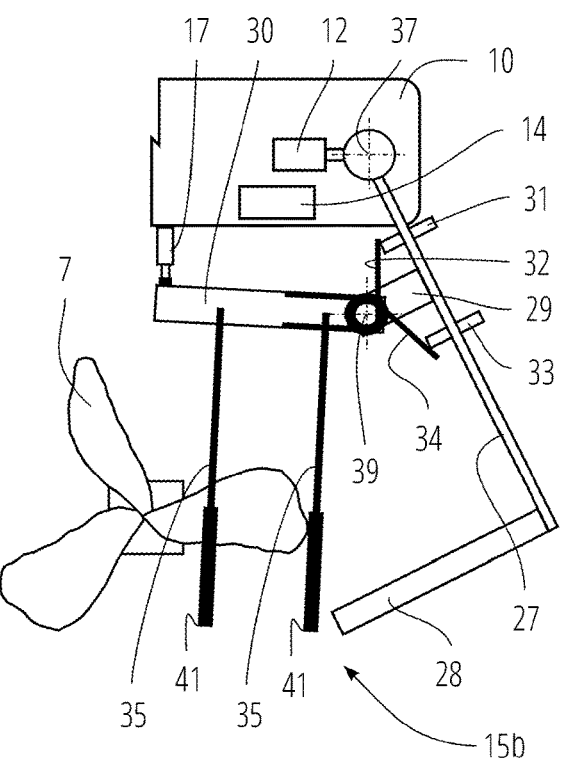
FIG. 10B illustrates the right working lever of the weeding unit.

The right working lever 15b comprises a weeding knife 27 with a blade 28 for cutting or destroying weed 8. Additionally, the right working lever 15b comprises at least one harrowing tine 35 with a ground engageable end 41 for pulling the weed 8 including its roots 49 out of the agricultural field 9 and separating the roots 49 of the weed 8 from soil of the agricultural field 9. The at least one harrowing tine 35 is attached to an arm 30 that is pivotably connected with an abutment 29 of the weeding knife 27 so that the at least one harrowing tine 35 may rotate relatively to the weeding knife 27 about a pivot axis 39 (as can be seen in FIG. 10B and FIG. 10D).

The at least one harrowing tine 35 may be actuated by a first actuating element 32 and a second actuating element 34. The first actuating element 32 may be a torsion spring attached between the abutment 29 and the arm 30 to urge the at least one harrowing tine 35 to a first deflected position (as can be seen in FIG. 10D). The second actuating element 34 may also be a torsion spring attached between the abutment 29 and the arm 30 to urge the at least one harrowing tine 35 to a second deflected position (as can be seen in FIG. 10B). Thus, the first actuating element 32 and the second actuating element 34 are configured to move the at least one harrowing tine 35 contrary so that the at least one harrowing tine 35 is urged by both actuating elements 32 and 34 to a neutral position (as can be seen in FIG. 2A, FIG. 2B, FIG. 10A or FIG. 10C). For example, the at least one harrowing tine 35 holds the neutral position when an equilibrium of forces of the first and second actuating elements 32 and 34 acting on the arm 30 is reached.

Figure 3:
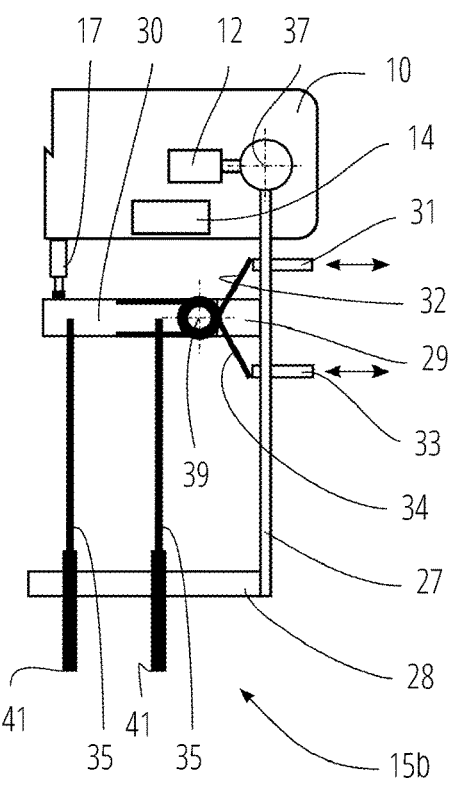
FIG. 3 illustrates a right working lever of a weeding unit.

The right working lever 15b also comprises a first and a second adjuster 31 and 33. The first adjuster 31 is an adjustment screw screwed in the right weeding knife 27 for adjusting the actuation force of the first actuating element 32. The second adjuster 33 is also an adjustment screw screwed in the right weeding knife 27 for adjusting the actuation force of the second actuating element 34. As can be seen in FIG. 3, the first and the second adjusters 31 and 33 can be separately screwed in to increase the actuation force of the corresponding actuating element 32 or 34, or separately screwed out to decrease the actuation force of the corresponding actuating element 32 or 34. The second adjuster 33 may be screwed in more than the first adjuster 31 so that the actuation force of the second actuating element 34 for moving the at least one harrowing tine 35 into the second deflected position (see FIG. 10B) is adjusted higher than the actuation force of the first actuating element 32 for moving the at least one harrowing tine 35 into the first deflected position (see FIG. 10D).

The carrier 10 also comprises a left end stop 16 to abut the harrowing tines 26 of the left working lever 15a and a right end stop 17 to abut the harrowing tines 35 of the right working lever 15b.

The left working lever 15a is equivalent to the right working lever 15b and comprises a weeding knife 18 with a blade 19 for cutting or destroying weed 8. Additionally, the left working lever 15a comprises at least one harrowing tine 26 with a ground engageable end 40 for pulling the weed 8 including its roots 49 out of the agricultural field 9 and separating the roots 49 of the weed 8 from soil of the agricultural field 9. The at least one harrowing tine 26 is attached to an arm 21 that is pivotably connected with an abutment 20 of the weeding knife 18 so that the at least one harrowing tine 26 may rotate relative to the weeding knife 18 about a pivot axis 38.

The at least one harrowing tine 26 may be actuated by a first actuating element 23 and a second actuating element 25. The first actuating element 23 may be a torsion spring attached between the abutment 20 and the arm 21 to urge the at least one harrowing tine 26 to a first deflected position. The second actuating element 25 may also be a torsion spring attached between the abutment 20 and the arm 21 to urge the at least one harrowing tine 26 to a second deflected position. Thus, the first actuating element 23 and the second actuating element 25 are configured to move the at least one harrowing tine 26 contrary so that the at least one harrowing tine 26 is urged by both actuating elements 23 and 25 to a neutral position (as can be seen in FIG. 2A, FIG. 2B). For example, the at least one harrowing tine 26 holds the neutral position when an equilibrium of forces of the first and second actuating elements 23 and 25 acting on the arm 21 is reached.

The left working lever 15a also comprises a first and a second adjuster 22 and 24. The first adjuster 22 is an adjustment screw screwed in the left weeding knife 18 for adjusting the actuation force of the first actuating element 23. The second adjuster 24 is also an adjustment screw screwed in the left weeding knife 18 for adjusting the actuation force of the second actuating element 25. The first and the second adjusters 22 and 24 can be separately screwed in to increase the actuation force of the corresponding actuating element 23 or 25, or separately screwed out to decrease the actuation force of the corresponding actuating element 23 or 25. The second adjuster 24 may be screwed in more than the first adjuster 22 so that the actuation force of the second actuating element 25 for moving the at least one harrowing tine 26 into the second deflected position is adjusted higher than the actuation force of the first actuating element 23 for moving the at least one harrowing tine 26 into the first deflected position.

FIGS. 3 through 7 each show a right part of the weeding unit 4a with some modifications of the right working lever 15b. These modifications are also applicable to the left working lever 15b as well as to the other weeding unit 4b of the implement 2.

Figure 4:
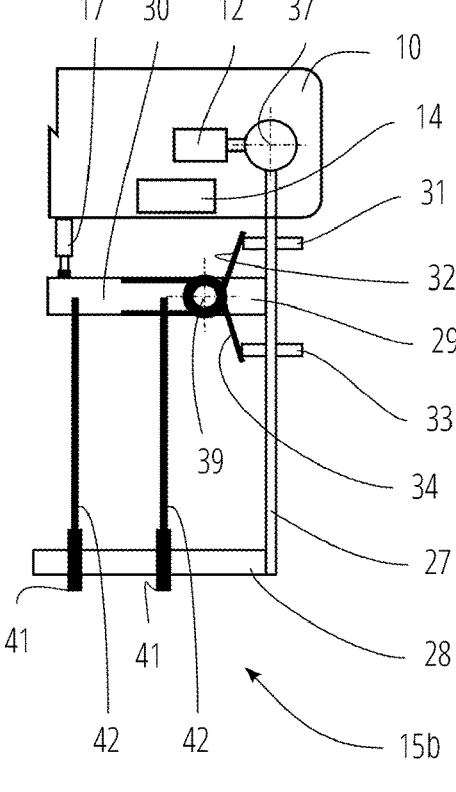
FIG. 4 illustrates a right working lever of a weeding unit with shorter harrowing tines.

The length of the at least one harrowing tines can be different. As can be seen in FIG. 4, the harrowing tines 42 are shorter than the harrowing tines 26 or 35 of the weeding unit 4a shown in FIG. 2A. The shorter the harrowing tines are, the closer the ground engageable ends 40 and 41 are positioned to the blades 19 and 28. But longer harrowing tines have the advantage that there is some distance between the cutting or weeding of the weeds 8 by the blades 19, 28 and the harrowing action by the harrowing tines 26, 35. This is more efficient since the two separate actions may cause more harm to the weeds 8 than when these actions are combined. Another advantage of the longer harrowing tines is that the risk for residue build-up may be decreased.

However, when the harrowing tines 26, 35, 42 are in the neutral position as can be seen in FIG. 2A and FIG. 4, the lengths of the harrowing tines 26, 35 and 42 are long enough that the ground engageable ends 40 and 41 of the harrowing tines 26, 35 and 42 are more distant from the carrier 10 than the blades 19 and 28 of the corresponding weeding knives 18 and 27 with which the harrowing tines 26, 35, 42 are connected.

Figure 5:
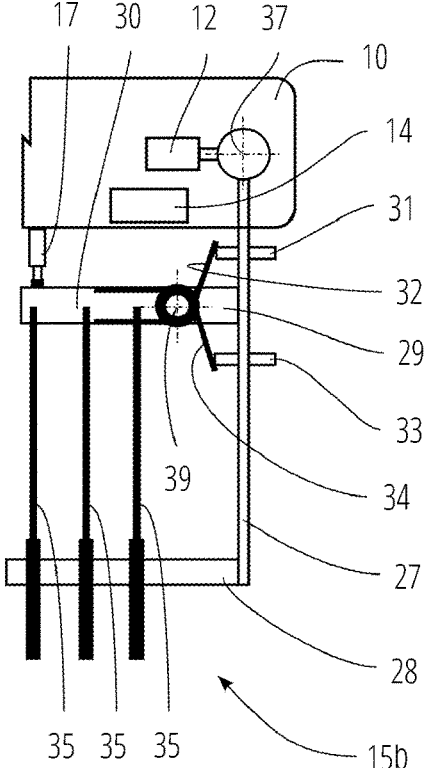
FIG. 5 illustrates a right working lever of a weeding unit with three harrowing tines.

As can be seen in FIG. 5, the number of harrowing tines of each working lever 15a, 15b can be varied. For example, the working lever 15b can be equipped with three (or more) harrowing tines 35.

Figure 6:
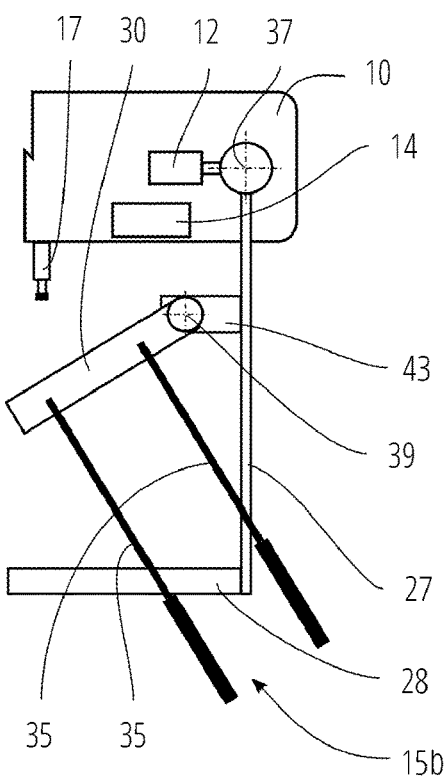
FIG. 6 illustrates a right working lever of a weeding unit.

As can be seen in FIG. 6, the harrowing tines 26, 35 can be driven by an actuating element 43 other than the torsion spring depicted as first or second actuating element 23, 25, 32, 34. For example, the torsion springs of the working levers 15a, 15b are replaced by an actuating element 43 designed as an electric motor for rotating the harrowing tines 26, 35 about their corresponding pivot axes 38 and 39. The actuating element 43 may drive the arm 21, 30 and may be controlled by the control unit 14.

Figure 7:
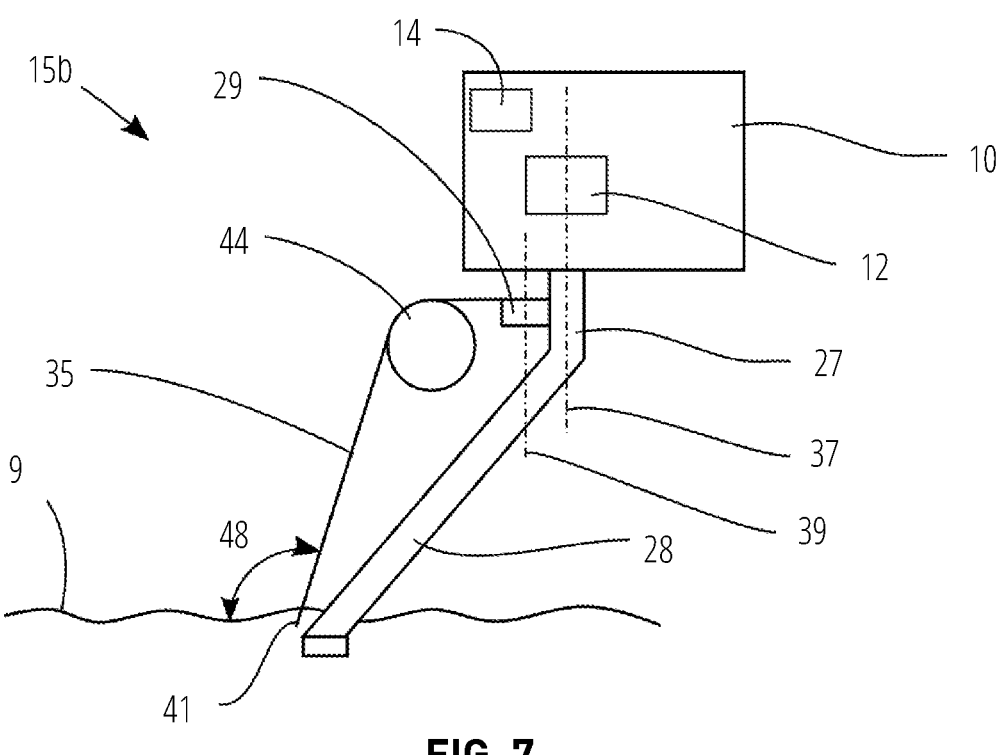
FIG. 7 illustrates a side view of a right working lever of a weeding unit.

FIG. 7 shows the right working lever 15b and the carrier 10 of the weeding unit in a side view. The pivot axis 37 of the right working lever 15b is parallel to the pivot axis 39 of the harrowing tines 35. Analogously, the pivot axis 36 of the left working lever 15a is parallel to the pivot axis 38 of the harrowing tines 26.

The ground engageable end 41 of the harrowing tine 35 is in contact with the agricultural field 9 for harrowing the agricultural field 9. The harrowing tine 35 is inclined at an inclination angle 48. The inclination angle 48 is adjustable by an adjuster 44 of the right working lever 15b and may be increased or decreased to adapt the time when the weeds 8 or residue will be released. The more the inclination angle 48 is increased, the earlier the weeds 8 or residue will be released.

Figure 8:
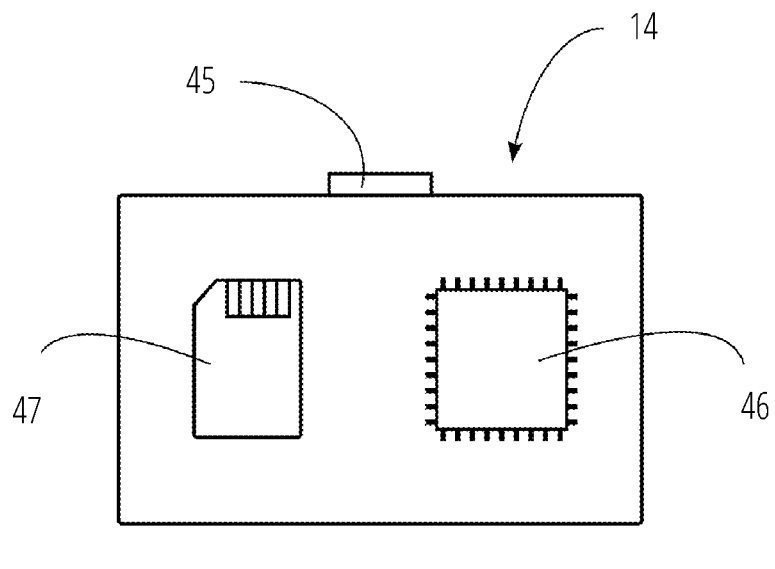
FIG. 8 shows a simplified view of a control unit of the weeding unit.

FIG. 8 shows the control unit 14 comprising an interface 45, a controller 46 and a memory 47. The control unit 14 may receive and send signals or data via the interface 45. The interface 45 may be a wireless interface or a connector. The controller 46 may store the data or signals received by the control unit 14 in the memory 47. The memory 47 may contain additional data or executable programs, for example in terms of a computer-implemented method, that may be retrieved, processed or carried out by the controller 46. Data or signals resulting from the processing of data or signals or from the execution of a program may be stored to the memory 47 or sent to the interface 45 by the controller 46. Each weeding unit 4a and 4b may comprise an equivalent control unit 14.

Figure 9:
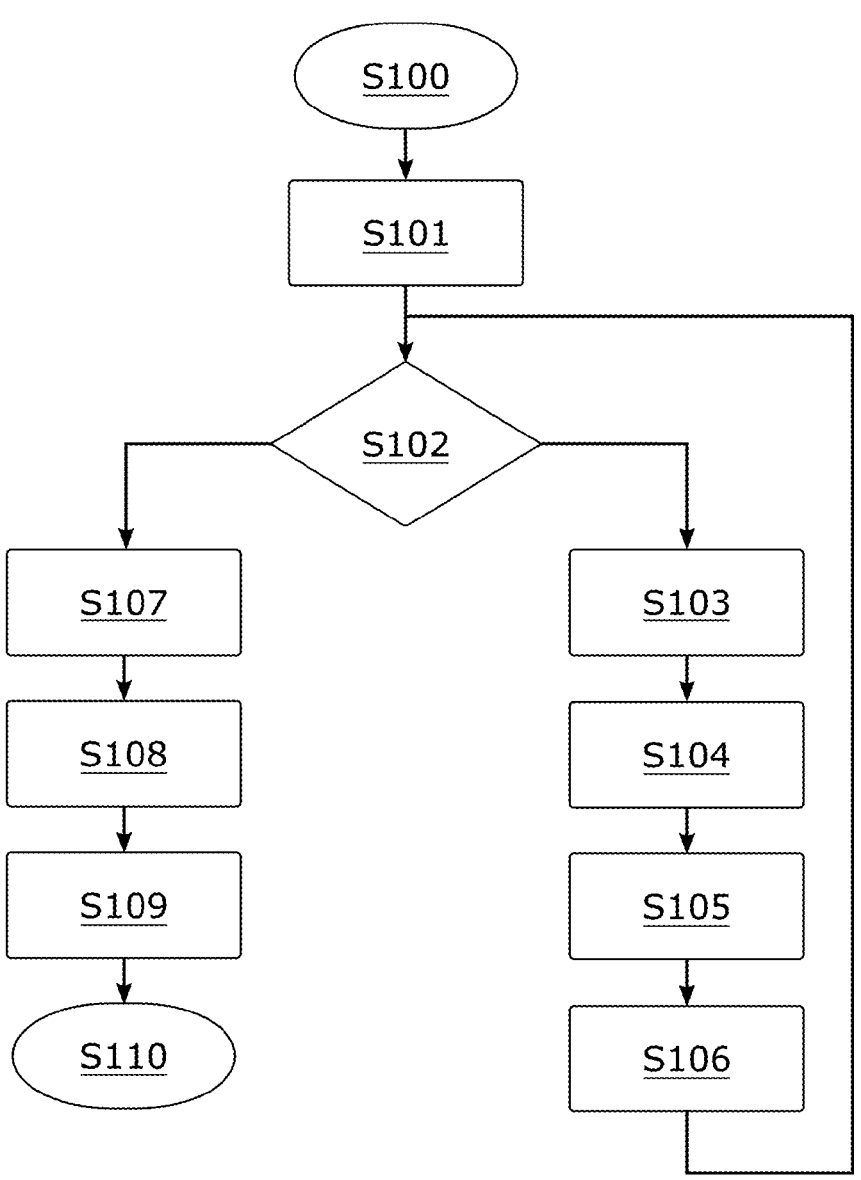
FIG. 9 illustrates a method for weeding and harrowing a field.

FIG. 9 shows a method for weeding and harrowing the agricultural field 9 for each weeding unit 4a and 4b when the agricultural vehicle 1 traverses the agricultural field 9. The method is stored in the memory 47 of the control unit 14 of each weeding unit 4a and 4b, and may be designed as a computer-implemented method. Each weeding unit 4a and 4b may carry out the method separately. For easier understanding, the method will be explained by way of example of weeding unit 4a in the following description.

S100 represents a beginning of the method. Act S101 represents capturing images of the crop row 6b with which the weeding unit 4a is aligned while the agricultural vehicle 1 traverses the agricultural field 9 along the driving direction 5. The images of the crop row 6b are captured continuously by the camera 13 and received by the control unit 14. The controller 46 processes the images for detecting a crop 7 (see FIG. 2A).

In act S102, the control unit 14 determines whether crop 7 is detected. As long as an absence of crop 7 (i.e., no crop 7) is detected, the left and right working levers and 15b of the weeding unit 4a are held in the closed position (see FIG. 2A). If the control unit 14 detects crop 7 (see FIG. 10A) act S103 is performed.

At act S103, the control unit 14 controls the left and right actuators 11 and 12 to move the left and right working levers 15a and 15b into the opened position (see FIG. 10B). Thus, the blades 19 and 28 of the weeding knives 18 and 27 are brought out of the crop row 6b and a damage of the crop 7 is avoided.

Because the treating of the agricultural field 9 by the ground engageable ends 40 and 41 of the harrowing tines 26 and 35 causes a friction, the harrowing tines 26 and 35 may not synchronously rotate with their corresponding weeding knives 18 and 27, but may remain for a short delay in their position. For example, while the weeding knives 18 and 27 are opened, the friction created by the harrowing tines 26 and 35 in the agricultural field 9 keeps the harrowing tines 26 and 35 temporarily in place. Thus, the harrowing tines 26 and 35 are deflected in the second deflected position in relation to their corresponding weeding knives 18 and 27. Due to this deflection, the first actuating elements 23 and 32 (torsion springs) are tensioned (see FIG. 10B).

Figure 10C:
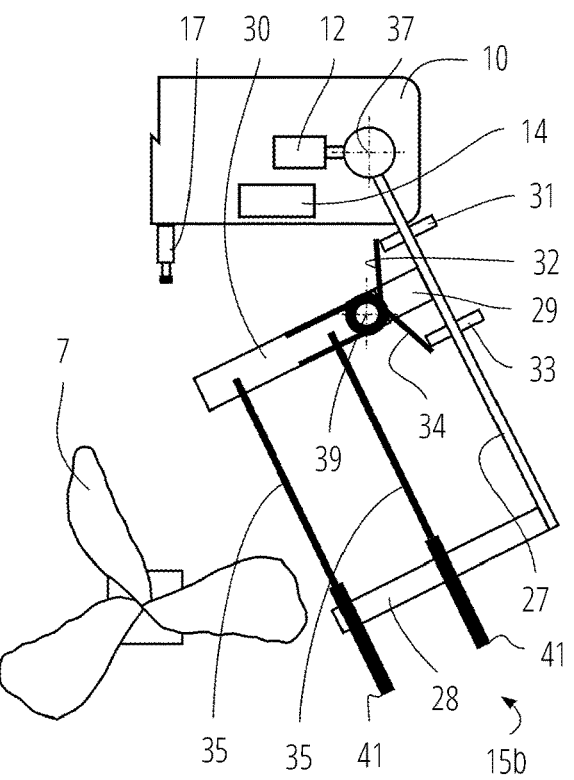
FIG. 10C illustrates the right working lever of the weeding unit.
Figure 10D:
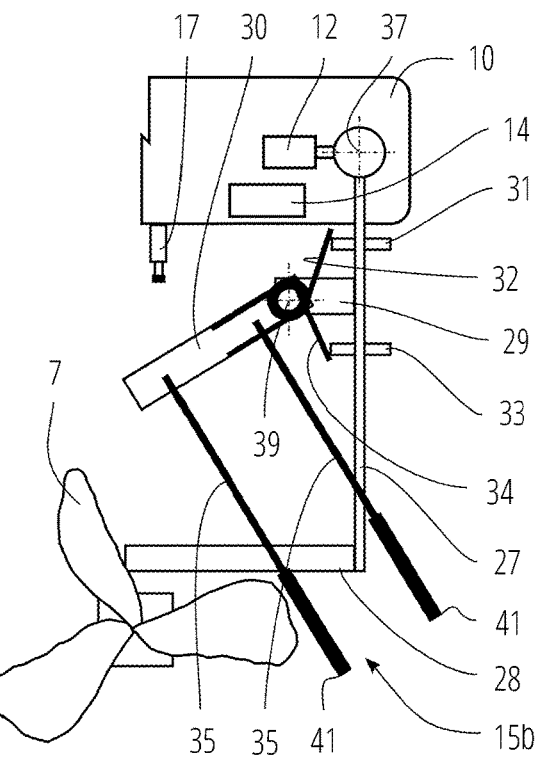
FIG. 10D illustrates the right working lever of the weeding unit.

Act S104 represents moving the harrowing tines 26 and 35 to the neutral position for preventing treatment of the crop 7 (see FIG. 10C). The increased tension of the first actuating elements 23 and 32 forces the harrowing tines 26 and 35 out of the crop row 6b. For example, the first actuating elements 23 and 32 urge the harrowing tines 26 and 35 to rotate in the same direction as the weeding knives 18 and 27 rotated into the opened position until an equilibrium of forces on the first and second actuating elements 23, 32 and 25, 34 acting on the arms 21 and 30 is reached again. Then, the harrowing tines 26 and 35 are positioned in the neutral position in relation to the weeding knives 18 and 27 as shown in FIG. 10C.

The agricultural vehicle 1 drives continuously in the driving direction 5, and the weeding knives 18 and 27 will pass the crop 7. The controller 46 may process the captured images of the camera 13 and the control unit 14 may detect that the weeding knives 18 and 27 have passed the crop 7. If no further crop 7 is detected, the method proceeds to act S105.

In act S105, the control unit 14 controls the left and right actuator 11 and 12 to move the left and right working lever 15a and 15b into the closed position (see FIG. 10D). Thus, the blades 19 and 28 of the weeding knives 18 and 27 are brought back to the crop row 6b for treating the crop row 6b and weeding weed 8 growing along the crop row 6b.

Again, since the treating of the agricultural field 9 by the ground engageable ends 40 and 41 of the harrowing tines 26 and 35 causes a friction, the harrowing tines 26 and 35 may not synchronously rotate with their corresponding weeding knives 18 and 27, but may remain for a short delay in their position. For example, while the weeding knives 18 and 27 are closed, the friction created by the harrowing tines 26 and 35 in the agricultural field 9 keeps the harrowing tines 26 and 35 temporarily in place. Thus, the harrowing tines 26 and 35 are deflected in the first deflected position in relation to their corresponding weeding knives 18 and 27. Due to this deflection, the second actuating elements 25 and 34 (torsion springs) are tensioned (see FIG. 10D).

Figure 10E:
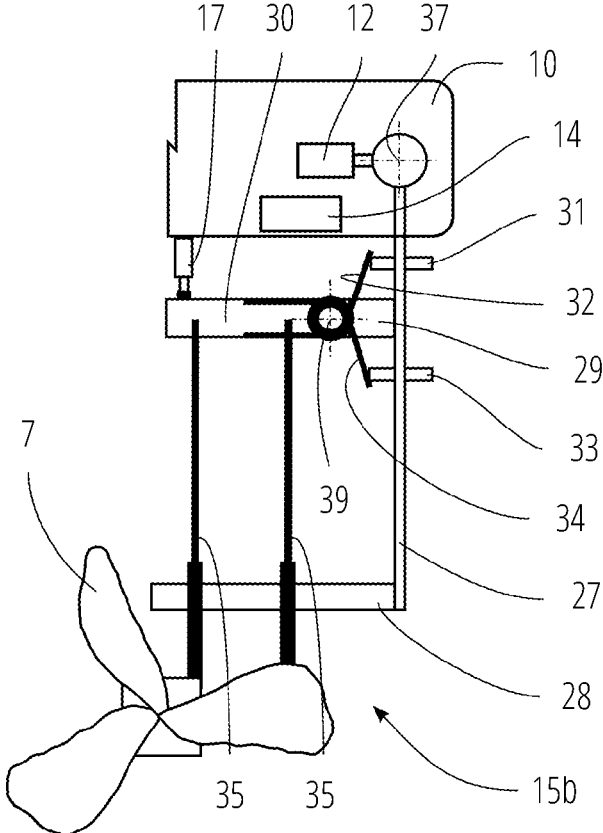
FIG. 10E illustrates the right working lever of the weeding unit.

Act S106 represents moving the harrowing tines 26 and 35 to the neutral position for additional treating of the crop row 6b (see FIG. 10E). While the weeding knives 18 and 27 have started to move to the closed position, the harrowing tines 26 and 35 follow to move after a short delay. The increased tension of the second actuating elements 25 and 34 forces the harrowing tines 26 and 35 back to the crop row 6b. For example, the second actuating elements 25 and 34 urge the harrowing tines 26 and 35 to rotate in the same direction as the weeding knives 18 and 27 rotated into the closed position until an equilibrium of forces of the first and second actuating elements 23, 32 and 25, 34 acting on the arms 21 and 30 is reached again. Then, the harrowing tines 26 and 35 are positioned in the neutral position in relation to the weeding knives 18 and 27 and abut against the end stops 16 and 17 as shown in FIG. 10E.

As explained above, the positioning of the harrowing tines 26 and 35 is slightly delayed with respect of the opening movement as well as of the closing movement of the weeding knives 18 and 27. By adjusting the actuation forces of the first and second actuating elements 23, 25 and 32, 34 of the harrowing tines 26 and 35 of each working lever 15a and 15b by their corresponding adjusters 22, 24 and 31, 33, the delay of the movement of the harrowing tines 26 and 35 into the neutral position can be adjusted. Preferably, the actuation forces of the second actuating elements 25 and 34 are set slightly more than actuation forces of the first actuating elements 23 and 32 since the movement of the harrowing tines 26 and 35 caused by the second actuating elements 25 and 34 endures more friction from the forward moving motion.

If the weeding unit 4a is equipped with a controllable actuating element 43 such as an electric motor for controlling the movement of the harrowing tines 26 and 35 (see FIG. 6) the delay of the movement of the harrowing tines 26 and 35 into the neutral position is adjustable. For example, the delay can be compensated completely so that the harrowing tines 26 and 35 move synchronously with their corresponding weeding knives 18 and 27.

The adjustment of the delayed movement of the harrowing tines 26 and 35 can be based on a time delay or on a travel distance of the weeding unit 4a.

The method repeats act S102. After the left and right working levers 15a and 15b have been moved into the closed position (see FIG. 10D, FIG. 10E), the working levers 15a and 15b remain in the closed position as long as an absence of crop 7 (i.e., no crop 7) is determined by the control unit 14.

Figure 11A:
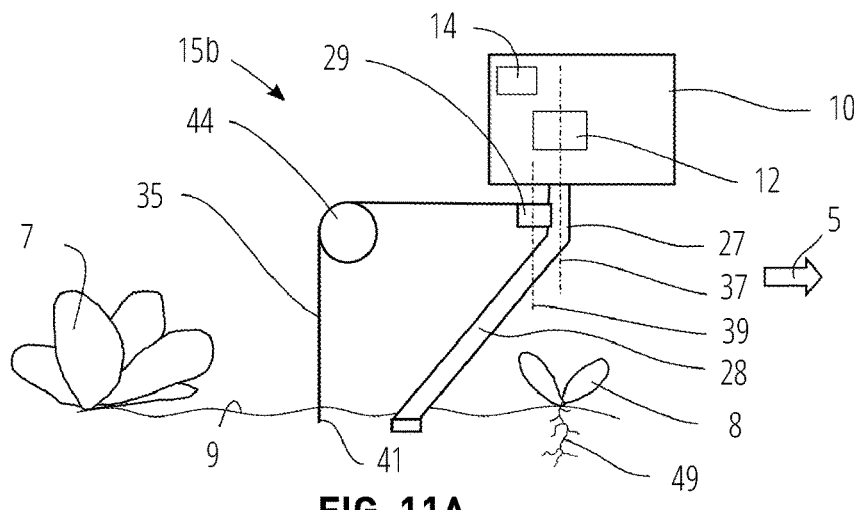
FIG. 11A illustrates a side view of the right working lever of the weeding unit.

As can be seen in FIG. 11A, the weeding unit 4a moves in driving direction 5 towards weed 8. The control unit 14 distinguishes the weed 8 from crop 7 and detects an absence of crop 7 in act S102. Thus, the method proceeds to act S107 for cutting the weed 8. The control unit 14 controls the actuators 11 and 12 to hold the working levers 15a and 15b in the closed position (see FIG. 10E and FIGS. 11A through 11E) for weeding the crop row 6b of the agricultural field 9 with the blades 19 and 28 of the weeding knives 18 and 27. The weeding blades 19 and 28 cut the soil of the agricultural field 9.

Figure 11B:
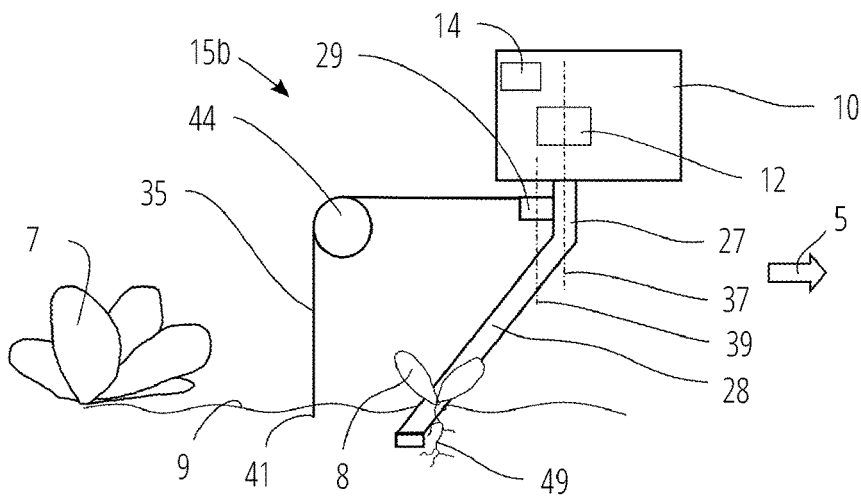
FIG. 11B illustrates a side view of the right working lever of the weeding unit.

As shown in FIG. 11B, when the blades 19 and 28 contact the weed 8, the blades 19 and 28 cut the weed 8 and its roots 49.

Figure 11C:
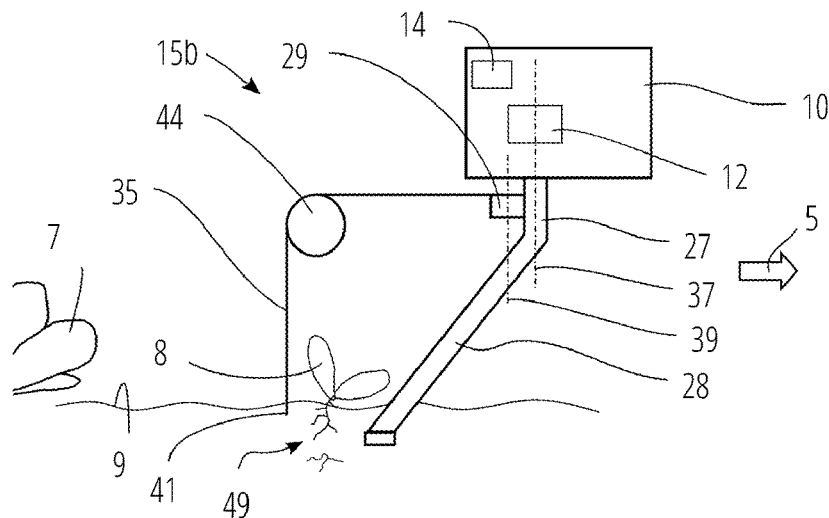
FIG. 11C illustrates a side view of the right working lever of the weeding unit.
Figure 11D:
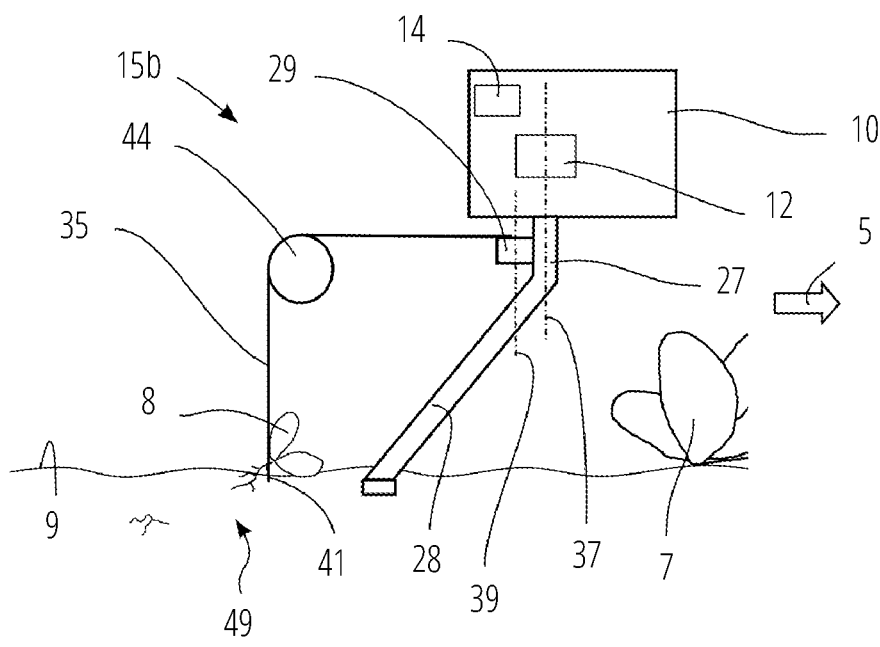
FIG. 11D illustrates a side view of the right working lever of the weeding unit.
Figure 11E:
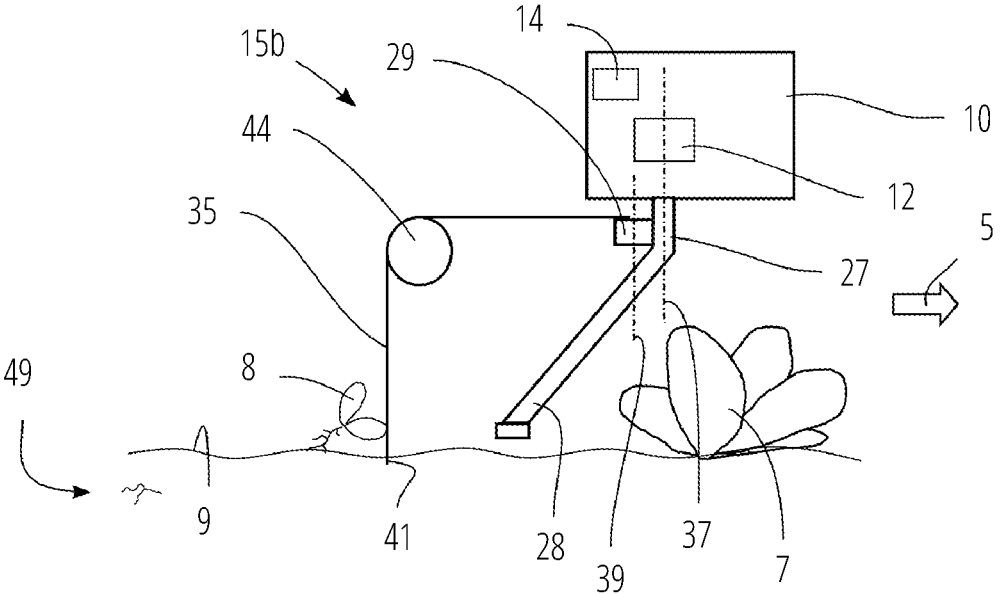
FIG. 11E illustrates a side view of the right working lever of the weeding unit.

The weeding unit 4a moves further in the driving direction 5 while the weed 8 and its roots 49 remain on the agricultural field 9 (see FIG. 11C). Weed 8 may be loosened in the soil of the agricultural field 9, and roots 49 may still be covered in a soil lump.

Act S108 represents harrowing the crop row 6b. While the weeding unit 4a is still moving in the driving direction 5, the ground engageable ends 40 and 41 of the harrowing tines 26 and 35 contact the weed 8 and its roots 49 (see FIG. 11D). Because the harrowing tines 26 and 35 are urged by the first actuating elements 23 and 32 and the second actuating elements 25 and 34 into the neutral position (see FIG. 10E), the harrowing tines 26 and 35 pick up the weed 8 and its roots 49 cut by the blades 19 and 28 of the weeding knives 18 and 27. The harrowing tines 26 and 35 may catch on to leaves or part of the root 49 or displace the weed 8 in its entirely, which results in a disruption of the root 49.

In act S109, the roots 49 of a weed 8 are separated from soil of the agricultural field 9 with the harrowing tines 26 and 35. The weeding unit 4a is still moving in the driving direction 5 so that the harrowing tines 26 and 35 drag the weed 8 forward to further separate the roots 49 of the weed 8 from soil (lump). The weed 8 may also be hurled out of the crop row when the harrowing tines 26 and 35 move away from the crop 7, for example from the second deflected position (as can be seen in FIG. 10B) to the neutral position (as can be seen in FIG. 10C). Finally, weed 8 lays on top of the agricultural field 9 without soil attached to the roots 49.

The method ends, as represented by S110. The method may restart at S100 again.

FIGS. 10A through 11E each show a right part of the weeding units 4a comprising the right working lever 15b. Nevertheless, the foregoing description with respect to these figures is also analogously applicable to the left part of the weeding unit 4a comprising the left working lever 15a.

All references cited herein are incorporated herein in their entireties. If there is a conflict between definitions herein and in an incorporated reference, the definition herein shall control.

LISTING OF DRAWING ELEMENTS 1 agricultural vehicle
2 implement
3 hitch
4a weeding unit
4b weeding unit
5 driving direction
6a crop row
6b crop row
6c crop row
6d crop row
7 crop
8 weed
9 agricultural field
10 carrier
11 actuator
12 actuator
13 camera
14 control unit
15a working lever
15b working lever
16 end stop
17 end stop
18 weeding knife
19 blade
20 abutment
21 arm
22 adjuster
23 first actuating element
24 adjuster
25 second actuating element 26 harrowing tine
27 weeding knife
28 blade
29 abutment
30 arm
31 adjuster
32 first actuating element
33 adjuster
34 second actuating element
35 harrowing tine
36 pivot axis
37 pivot axis
38 pivot axis
39 pivot axis
40 ground engageable end
41 ground engageable end
42 harrowing tine
43 actuating element
44 adjuster
45 interface
46 controller
47 memory
48 angle
49 root

What is claimed is:

1. A weeding unit for treating an agricultural field, comprising:
   a carrier;
   at least one working lever movably connected with the carrier;
   at least one actuator for moving the at least one working lever; and
   a control unit configured to:
      distinguish crop from weed; and
      control the at least one actuator for treating the weed;
      wherein the at least one working lever comprises:
         a weeding knife; and
         at least one harrowing tine;
      wherein the at least one harrowing tine is movably connected with the weeding knife for moving the at least one harrowing tine relative to the weeding knife; and
      wherein the at least one harrowing tine is pivotably connected with the weeding knife at a pivot axis.

2. The weeding unit of claim 1, wherein the at least one working lever is pivotably connected with the carrier about a pivot axis, and wherein the pivot axis of the working lever is parallel to the pivot axis of the harrowing tine.

3. The weeding unit of claim 1, wherein the least one working lever comprises a first actuating element configured to move the at least one harrowing tine into a first deflected position.

4. The weeding unit of claim 3, wherein the at least one working lever comprises a second actuating element configured to move the at least one harrowing tine into a second deflected position.

5. The weeding unit of claim 4, wherein the first actuating element and the second actuating element are configured to move the at least one harrowing tine contrary for urging the at least one harrowing tine into a neutral position.

6. The weeding unit of claim 5, wherein the least one working lever comprises at least one adjuster for adjusting the actuation force of the actuating element.

7. The weeding unit of claim 6, wherein the least one working lever comprises:
   a first adjuster for adjusting the actuation force of the first actuating element; and a second adjuster for adjusting the actuation force of the second actuating element.

8. The weeding unit of claim 6, wherein the at least one adjuster is configured such that the actuation force for moving the at least one harrowing tine into the second deflected position is greater than the actuation force for moving the at least one harrowing tine into the first deflected position.

9. The weeding unit of claim 3, wherein the actuating element comprises a torsion spring.

10. An implement comprising at least one weeding unit of claim 1, wherein the implement is configured to bring each weeding unit into alignment with a separate crop row.

11. A weeding unit for treating an agricultural field, comprising:

a carrier;

at least one working lever movably connected with the carrier;

at least one actuator for moving the at least one working lever; and a control unit configured to:

distinguish crop from weed; and control the at least one actuator for treating the weed;

wherein the at least one working lever comprises:

a weeding knife; and at least one harrowing tine;

wherein the at least one harrowing tine is movably connected with the weeding knife for moving the at least one harrowing tine relative to the weeding knife;

wherein the least one working lever comprises a first actuating element configured to move the at least one harrowing tine into a first deflected position;

wherein the at least one working lever comprises a second actuating element configured to move the at least one harrowing tine into a second deflected position;

wherein the first actuating element and the second actuating element are configured to move the at least one harrowing tine contrary for urging the at least one harrowing tine into a neutral position;

wherein the least one working lever comprises at least one adjuster for adjusting the actuation force of the actuating element; and wherein the at least one adjuster comprises an adjustment screw integrated into the weeding knife.

12. A weeding unit for treating an agricultural field, comprising:

a carrier;

at least one working lever movably connected with the carrier;

at least one actuator for moving the at least one working lever; and a control unit configured to:

distinguish crop from weed; and control the at least one actuator for treating the weed;

wherein the at least one working lever comprises:

a weeding knife; and at least one harrowing tine;

wherein when the at least one harrowing tine is in a neutral position, a ground engageable end of the at least one harrowing tine is more distant from the carrier than from a blade of the weeding knife.

13. The weeding unit of claim 12, wherein the at least one harrowing tine is movably connected with the weeding knife for moving the at least one harrowing tine relative to the weeding knife.

14. The weeding unit of claim 13, wherein the at least one harrowing tine is pivotably connected with the weeding knife at a pivot axis.

15. A method for treating an agricultural field with a weeding unit traversing the agricultural field, the method comprising:

detecting crop in a crop row of the agricultural field;

moving at least one weeding knife to an opened position and moving at least one harrowing tine to a neutral position to prevent treatment of the crop by the at least one weeding knife and the at least one harrowing tine;

moving the at least one weeding knife to a closed position while the at least one harrowing tine remains in a deflected position to treat the crop row with the at least one weeding knife; and moving the at least one harrowing tine to the neutral position to the closed positing to treat the crop row with the at least one harrowing tine.

16. The method of claim 15, wherein moving the at least one harrowing tine to the neutral position is performed after moving the at least one weeding knife to a closed position.

17. The method of claim 15, wherein moving the at least one harrowing tine to the neutral position is performed after moving the at least one weeding knife to a closed position based on a travel distance of the weeding unit.

18. The method of claim 15, wherein the at least one weeding knife is moved to a closed position after detecting at least one condition selected from the group consisting of presence of weed and absence of crop.

19. The method of claim 15, further comprising separating roots of a weed from soil of the agricultural field with the at least one harrowing tine.

* * * * *